United States Patent
Suh

(10) Patent No.: US 11,580,005 B2
(45) Date of Patent: Feb. 14, 2023

(54) ANOMALY PATTERN DETECTION SYSTEM AND METHOD

(71) Applicant: ELLEXI CO., LTD., Seoul (KR)

(72) Inventor: Jang Won Suh, Seoul (KR)

( * ) Notice: Subject to any disclaimer, the term of this patent is extended or adjusted under 35 U.S.C. 154(b) by 447 days.

(21) Appl. No.: 16/677,691

(22) Filed: Nov. 8, 2019

(65) Prior Publication Data

US 2020/0285555 A1 Sep. 10, 2020

(30) Foreign Application Priority Data

Mar. 5, 2019 (KR) .................. 10-2019-0025066

(51) Int. Cl.
| | |
|---|---|
| *G06F 11/34* | (2006.01) |
| *G06N 20/00* | (2019.01) |
| *G06N 3/088* | (2023.01) |
| *G06F 11/30* | (2006.01) |

(52) U.S. Cl.
CPC ...... *G06F 11/3447* (2013.01); *G06F 11/3006* (2013.01); *G06F 11/3452* (2013.01); *G06F 11/3466* (2013.01); *G06N 3/088* (2013.01); *G06N 20/00* (2019.01)

(58) Field of Classification Search
CPC ............. G06F 11/3447; G06F 11/3452; G06F 11/3466; G06F 11/3006; G06N 20/00; G06N 3/088
See application file for complete search history.

(56) References Cited

U.S. PATENT DOCUMENTS

| | | | | |
|---|---|---|---|---|
| 8,484,022 | B1* | 7/2013 | Vanhoucke | G10L 19/0018 704/240 |
| 10,248,533 | B1* | 4/2019 | Shah | G06N 20/20 |
| 2019/0166141 | A1* | 5/2019 | Xu | G06N 3/0454 |
| 2019/0205785 | A1* | 7/2019 | Volk | G06N 5/04 |
| 2019/0286506 | A1* | 9/2019 | Cheng | G06N 3/088 |
| 2020/0112574 | A1* | 4/2020 | Koral | G06N 3/0454 |
| 2020/0210849 | A1* | 7/2020 | Ben Kimon | G06N 3/0454 |
| 2021/0327456 | A1* | 10/2021 | Yamaguchi | G06N 3/088 |

OTHER PUBLICATIONS

Ji-Won Jung et al., "Anomaly Detection Test using Autoencoder in IoT Device Environment", Papers of the Korean Institute of Information Scientists and Engineers, Dec. 2018, pp. 1845-1846.

H.I. Kim et al., "Research Trends for Deep Learning-Based High-Performance Face Recognition Technology", 2018 Electronics and Telecommunications Trends, Aug. 2018, pp. 43-53.

* cited by examiner

Primary Examiner — Yolanda L Wilson

(57) ABSTRACT

Provided is an anomaly pattern detection system including an anomaly detection device connected to one or more servers. The anomaly detection device may include an anomaly detector configured to model input data by considering all of the input data as normal patterns, and detect an anomaly pattern from the input data based on the modeling result.

8 Claims, 3 Drawing Sheets

ANOMALY PATTERN DETECTION SYSTEM AND METHOD

CROSS-REFERENCES TO RELATED APPLICATION

The present application claims priority under 35 U.S.C. § 119(a) to Korean application number 10-2019-0025066, filed on Mar. 5, 2019, in the Korean Intellectual Property Office, which is incorporated herein by reference in its entirety.

BACKGROUND

1. Technical Field

Various embodiments generally relate to an anomaly pattern detection system and method, and more particularly, to an anomaly pattern detection system and method using a neural network.

2. Related Art

Anomaly patterns refer to suspicious data that take on a different aspect from other data, i.e. data of interest that need to be extracted in distinction from noise data.

The anomaly pattern detection technology is utilized for the operation of a computing system and a security system and the management of process data in a manufacturing industry. Recently, research is conducted on the technology that automatically finds unexpected anomaly patterns in input data based on statistical modeling and machine learning, in order to identify abnormal behaviors.

The anomaly pattern detection technology based on machine learning has difficulties in securing training data due to a difference in appearance frequency between normal patterns and anomaly patterns. That is, since there are few cases in which patterns are defined as anomaly patterns, specific variables or features capable of identifying anomaly patterns cannot be settled, which makes it difficult to distinguish between normal patterns and anomaly patterns.

Furthermore, since anomaly patterns which rarely appear need to be tagged, a lot of resources are consumed.

SUMMARY

In an embodiment, there is provided an anomaly pattern detection system including an anomaly detection device connected to one or more servers. The anomaly detection device may include an anomaly detector configured to model input data by considering all of the input data as normal patterns, and detect an anomaly pattern from the input data based on the modeling result.

In an embodiment, there is provided an anomaly pattern detection method of an anomaly detection device which is connected to one or more servers. The anomaly pattern detection method may include the steps of: modeling, by the anomaly detection device, input data by considering all of the input data as normal patterns; and detecting, by the anomaly detection device, an anomaly pattern from the input data based on the modeling result.

DETAILED DESCRIPTION

Hereinafter, an anomaly pattern detection system and method according to the present disclosure will be described below with reference to the accompanying drawings through exemplary embodiments.

Figure 1:
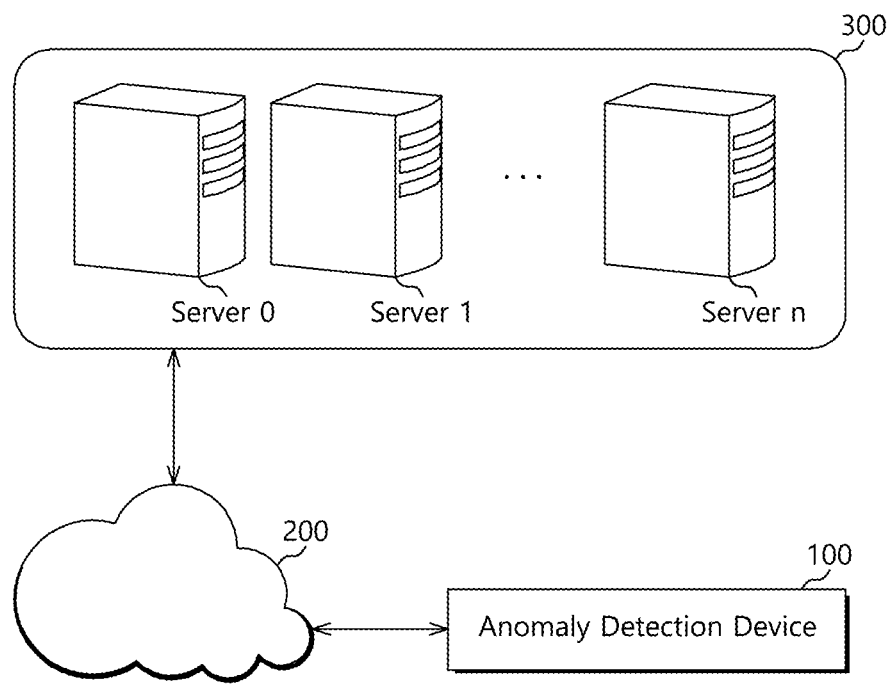
FIG. 1 is a configuration diagram illustrating an anomaly pattern detection system in accordance with an embodiment.

FIG. 1 is a configuration diagram illustrating an anomaly pattern detection system in accordance with an embodiment.

Referring to FIG. 1, the anomaly pattern detection system 10 in accordance with the present embodiment may include an anomaly detection device 100 and servers 300 connected to the anomaly detection device 100 through a communication network 200.

The servers 300 may indicate a group of one or more servers 0 to n, and include various servers which hope to detect anomaly patterns. The various servers may include financial institution servers, medical institution servers, cloud servers, corporate servers, application service providing servers and the like.

The anomaly detection device 100 may receive target monitoring data from the servers 300 and learn the received data. In an embodiment, the anomaly detection device 100 may generate a learning model by learning the target monitoring data under the supposition that the target monitoring data are all normal patterns. The anomaly detection device 100 may generate output data from the target monitoring data using the learning model, and compare the target monitoring data to the output data generated form the target monitoring data, in order to determine whether the target monitoring data are normal patterns or anomaly patterns.

Since it is assumed that the target monitoring data are all normal patterns, the anomaly detection device 100 does not need to separately learn or tag anomaly patterns.

A data-based artificial intelligence learning method is operated to learn more about data which are accessed and inputted more frequently. For similar data, the artificial intelligence learning method is also operated to learn more about data which belong to a similar data, as the data are accessed more frequently.

Therefore, the artificial intelligence learning method learns more about a normal pattern whose appearance frequency is high or reliably learns about the normal pattern, but cannot learn about an anomaly pattern whose appearance frequency is low or learns less about the anomaly pattern.

The anomaly pattern detection system in accordance with the present embodiment may consider target monitoring data as a normal pattern when a similarity between the target monitoring data and learned data expressed as the learning model is high, and consider the target monitoring data as an anomaly pattern when the similarity is low.

Figure 2:
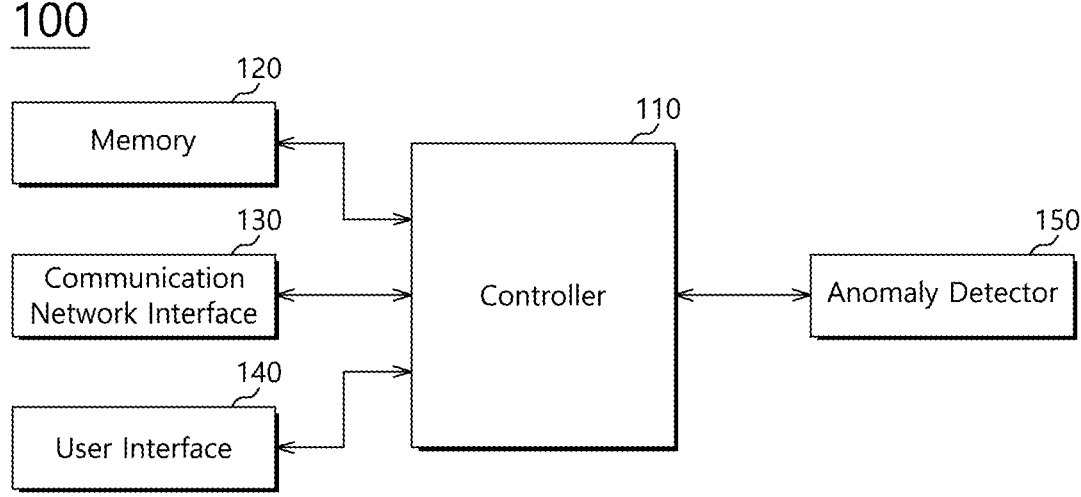
FIG. 2 is a configuration diagram illustrating an anomaly detection device in accordance with an embodiment.

FIG. 2 is a configuration diagram illustrating the anomaly detection device in accordance with the present embodiment.

Referring to FIG. 2, the anomaly detection device 100 may include a controller 110, a memory 120, a communication network interface 130, a user interface 140 and an anomaly detector 150.

The controller 110 may control overall operations of the anomaly detection device 100.

The memory 120 may include a ROM and RAM, and various system data, firmware codes and software codes, which are required for operations of the anomaly detection device 100, may be stored and loaded into the memory 120.

The controller 110 may decode and execute a code-based instruction or algorithm such as firmware or software, stored and loaded in the memory 120, in order to control overall operations of the anomaly detection device 100.

The communication network interface 130 may provide an interface in which the servers 300 and the anomaly detection device 100 can transmit and receive data according to a preset protocol.

The user interface 140 may include an input interface through which an administrator or operator of the anomaly detection device 100 can access the anomaly detection device 100 and an output interface through which an operation state and result of the anomaly detection device 100 can be provided to the administrator or operator. The input interface may include one or more of input devices such as a mouse, a keyboard and a touch device, and the output interface may include one or more of output devices such as a monitor, a speaker and a printer.

The anomaly detector 150 may be configured to learn target monitoring data provided through the communication network interface 130 under control of the controller 110, and detect an anomaly pattern from the target monitoring data.

In an embodiment, the anomaly detector 150 may be configured to consider all target monitoring data as normal patterns, and learn the target monitoring data. As the target monitoring data are all considered as normal patterns, the anomaly detector may generate a learning model which has a high learning rate for a normal pattern whose appearance frequency is relatively high, and thus expresses the normal pattern. Therefore, since a modeling result of an anomaly pattern whose appearance frequency is relatively low inevitably has a low similarity to the learning model, the anomaly pattern can be automatically detected.

Figure 3:
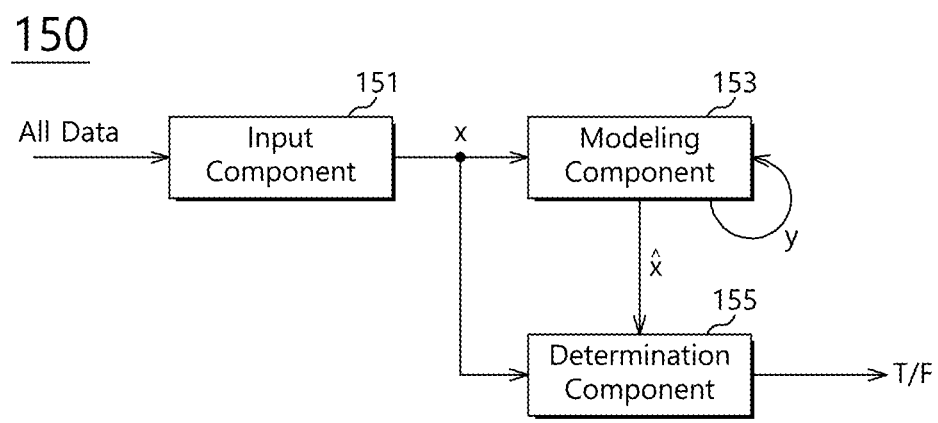
FIG. 3 is a configuration diagram illustrating an anomaly detector in accordance with an embodiment.

FIG. 3 is a configuration diagram illustrating the anomaly detector in accordance with the present embodiment.

Referring to FIG. 3, the anomaly detector 150 in accordance with the present embodiment may include an Input component 151, a modeling component 153 and a determination component 155.

The Input component 151 may be configured to preprocess all input target monitoring data. In an embodiment, the preprocessing process performed by the Input component 151 may include a normalization process to correct a feature range of input data into a preset range. However, the present embodiment is not limited thereto.

The modeling component 153 may be configured to receive all the normalized data, and generate output data $\hat{x}$ similar or approximate to the input data x by learning the input data. The modeling component 153 may store a parameter y such as a weight generated as the learning result.

In an embodiment, the modeling component 153 may generate a learning model based on the supposition that all of the input data x are normal patterns in a learning mode. That is, the modeling component 153 may generate the learning model in which the normal patterns are expressed.

In an embodiment, the modeling component 153 may learn target monitoring data inputted in an inference mode based on the learning model generated in the learning mode, and generate output data which are modeled approximately to the input target monitoring data.

In an embodiment, the modeling component 153 may be configured as an auto-encoder.

The auto-encoder, which is an unsupervised learning model based on a deep neural network, may be configured by attaching two neural networks to each other. While the neural network on an input side serves as an encoder and the neural network on an output side serves as a decoder, the encoder may extract the features of input data, and the decoder may regenerate original data using the extracted features.

Figure 4:
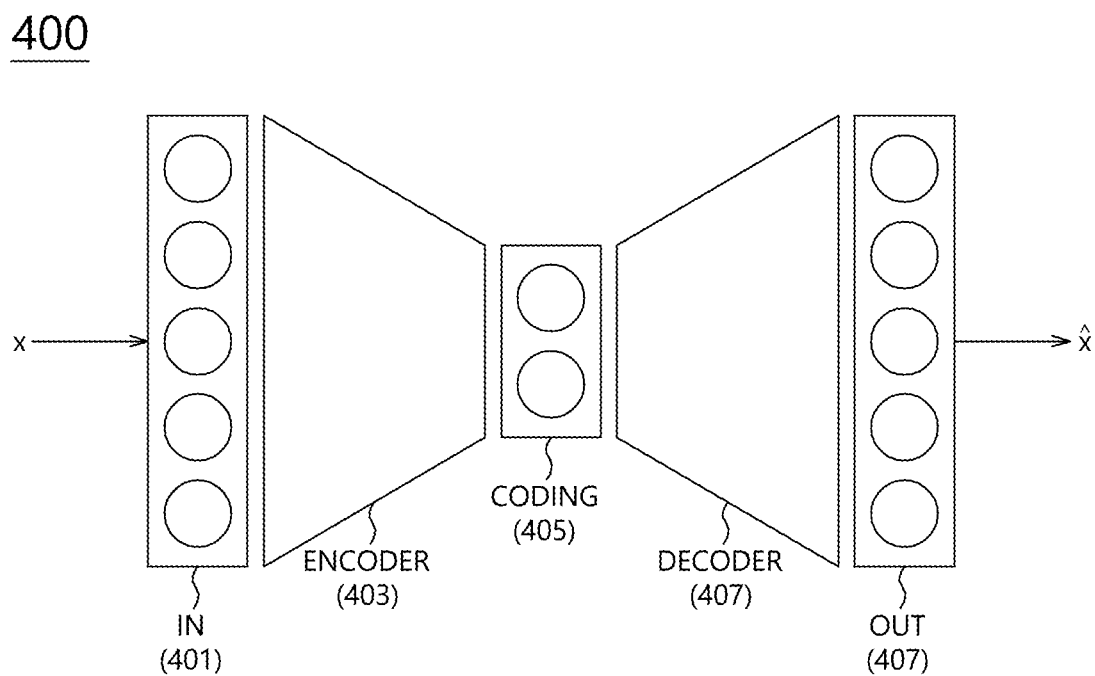
FIG. 4 is a conceptual view illustrating a neural network model in accordance with an embodiment.

FIG. 4 is a conceptual view of a neural network model in accordance with an embodiment, illustrating the auto-encoder.

An input layer (IN) 410 may include N neurons (nodes) to receive input data x. The number N of neurons in the input layer 401 is equal to the number of dimensions of the input data.

An encoder (ENCODER) 403 may include one or more hidden layers, and be configured to output feature data by reducing the dimensions of the input data x. The number of neurons constituting each of the hidden layers which constitute the encoder 403 may be equal to or larger or smaller than the number N of neurons constituting the input layer 401.

A coding layer (CODING) 405 may be configured to receive the feature data obtained by the dimension reduction of the encoder 403. That is, the data applied to the coding layer 405 may be data obtained by reducing the dimensions of the input data through the encoder 403.

A decoder (DECODER) 407 may be configured to regenerate the input data using the feature data transferred to the coding layer 405, and output the regenerated data as output data $\hat{x}$. The decoder 407 may include one or more hidden layers.

The decoder 407 may have the same structure as the encoder 403, and perform learning such that weights (parameters) of the encoder 403 and the decoder 407 have the same value.

An output layer (OUT) 409 may include N neurons like the input layer 401, and be configured to output the output data $\hat{x}$ which are modeled in a similar manner to the input data x.

According to the principle of the auto-encoder, the auto-encoder may perform learning such that the input data and the output data $\hat{x}$ are as equal to each other as possible, while the input data are passed through the encoder 403 and the decoder 407, in order to reliably extract the features of the input data.

As such, the auto-encoder is a neural network for equalizing the input data and the output data, and is characterized in that the number of dimensions of the input data x inputted to the input layer 401 of the encoder 403 is equal to the number of dimensions of the output data $\hat{x}$ outputted from the output layer 409, and the coding layer 405 expresses the input data x as a smaller number of dimensions than the input layer 401 and the output layer 409.

The learning process using the auto-encoder will be briefly described as follows.

First, the dimensions of the input data x are reduced through the encoder 403, and encoded data is outputted to the coding layer 405. The decoder 407 decodes the feature data applied to the coding layer 405, and generates output data x̂ which has the same dimensions as the input data x and is approximate to the input data x.

The decoder 407 minimizes an error included in the output data x̂, and propagates the minimized error value back to the encoder 403 to adjust a parameter such as a weight or bias. While such a process is repeated several times, the optimal features are extracted.

When the auto-encoder is used, the input data can be compressed, and noise can be effectively removed from the input data. Therefore, although noise is added to the input data, the auto-encoder can reliably extract features of the input data.

Referring back to FIG. 3, the modeling component 153 may generate a learning model by learning the parameter in the learning mode in order to generate output data similar to the input data, and generate the output data x̂ by modeling the target monitoring data according to the parameter learned in the learning mode, i.e. the learning model, in the inference mode.

The determination component 155 may be configured to compare the input data x as the target monitoring data to the output data x̂ generated through the modeling component 153, and determine whether the input data x is a normal pattern or anomaly pattern.

In an embodiment, the determination component 155 may determine whether the input data is a normal pattern, using a method selected among various methods for measuring the similarity between the output data x̂ generated from the input data x. For example, the similarity measurement methods may include an Euclidean distance measurement method, a cosine similarity measurement method and the like.

Therefore, in the learning mode, the anomaly detector models the input data through the auto-encoder by learning the parameter in order to generate the output data similar to the input data. Then, in the inference mode, the anomaly detector may generate the output data from the input data using the learning model, and compare the input data and the output data to detect an anomaly pattern. Furthermore, the input data in the inference mode may also be used to update the parameter.

Figure 5:
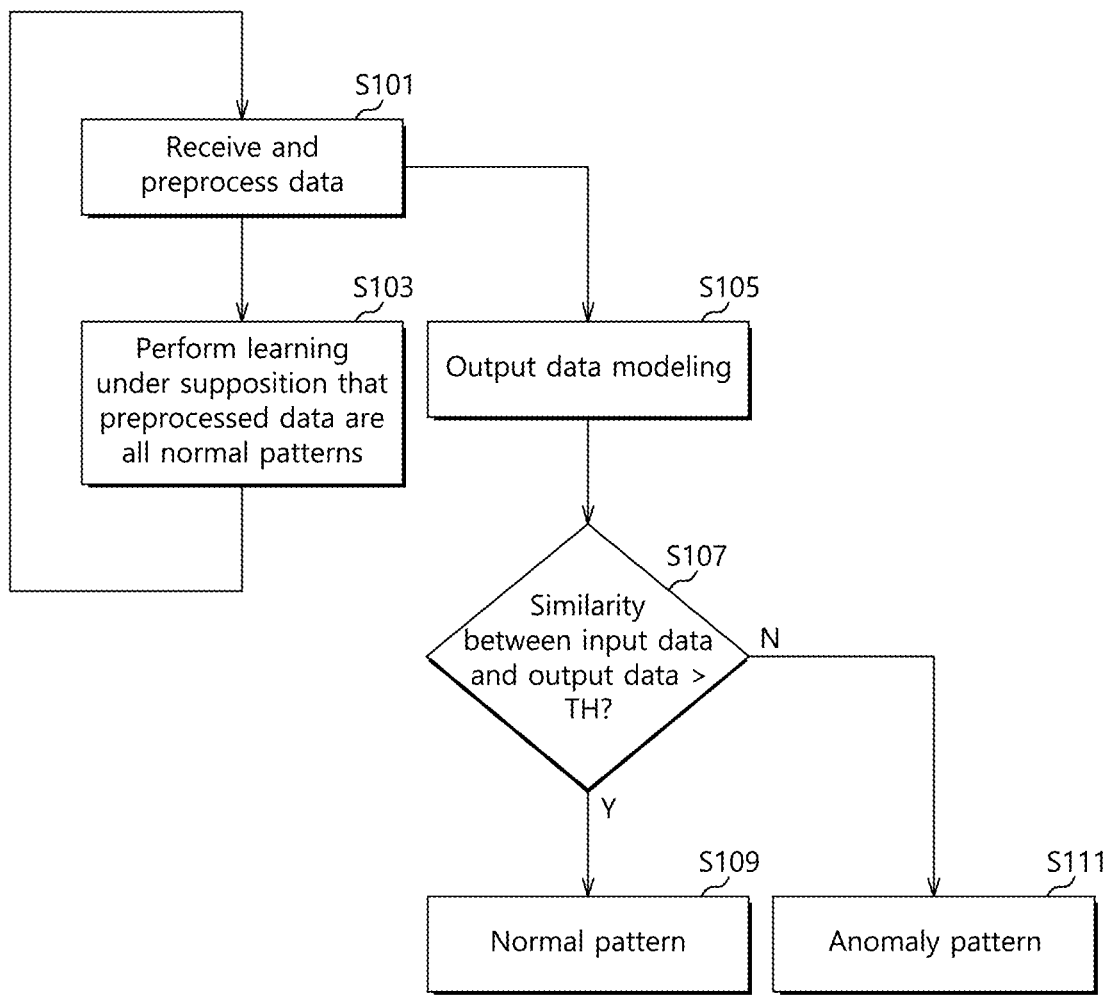
FIG. 5 is a flowchart for describing an anomaly pattern detection method in accordance with an embodiment.

FIG. 5 is a flowchart for describing an anomaly pattern detection method in accordance with an embodiment.

Referring to FIG. 5, the anomaly detector 150 may operate in the learning mode and the inference mode.

In the learning mode, the anomaly detector 150 may receive all target monitoring data, and preprocess the received data in step S101.

Then, the anomaly detector 150 may generate a learning model by learning the preprocessed data under the supposition that all of the preprocessed data are normal patterns, in step S103. In order to generate the learning model, the anomaly detector 150 may model the input data using the above-described auto-encoder, such that the output data have a similar value to the input data.

The learning mode may be repeatedly performed to extract the optimal features from the input data.

In the inference mode, the anomaly detector 150 may generate the output data from the preprocessed input data in step S105. In order to generate the output data, the anomaly detector 150 may generate the output data approximate to the input data using the auto-encoder, as in the learning mode.

When the output data are generated, the anomaly detector 150 may check whether the similarity between the input data and the output data is higher than a preset threshold TH, in step S107. When the check result indicates that the similarity is higher than the preset threshold TH, the anomaly detector 150 may determine that the input data is a normal pattern, in step S109. Otherwise, the anomaly detector 150 may determine that the input data is an anomaly pattern, in step S111.

Figure 6:
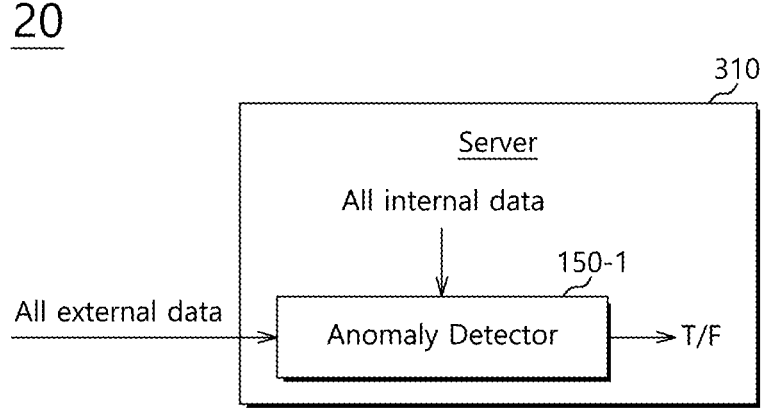
FIG. 6 is a configuration diagram illustrating an anomaly pattern detection system in accordance with an embodiment.

FIG. 6 is a configuration diagram of an anomaly pattern detection system in accordance with an embodiment.

Referring to FIG. 6, the anomaly pattern detection system 20 in accordance with the present embodiment may include an anomaly detector 150-1 installed in a server computing device 310. The anomaly detector 150-1 may be embedded in the server computing device 310, connected through an interface port, or implemented as an application program to be executed by the server computing device 310 and stored in a storage medium.

The anomaly detector 150-1 may receive all target monitoring data inputted to the server computing device 310 from an external device or all target monitoring data generated in the server computing device 310, and operate in a learning mode and an inference mode to detect an anomaly pattern.

The anomaly detector 150-1 may have substantially the same configuration as the anomaly detector 150 illustrated in FIG. 3.

Therefore, under the supposition that target monitoring data generated inside or outside are all normal patterns, the anomaly detector 150-1 may generate a learning model by generating output data similar to input data through the unsupervised learning method. The anomaly detector 150-1 may compare the input target monitoring data to the output data obtained by learning the target monitoring data based on the learning model, and determine that the target monitoring data is a normal pattern (T) when the similarity therebetween is high, or determine that the target monitoring data is an anomaly pattern (F) when the similarity is low.

In the present embodiment, when using the auto-encoder based on the unsupervised learning method, the anomaly detector 150-1 performs learning under the supposition that input data are all normal patterns. Thus, since tagging for an anomaly pattern is not needed, it is possible to save resources.

In particular, since an anomaly pattern appears at a lower frequency than a normal pattern, it is difficult to learn the anomaly pattern. In accordance with the present embodiment, however, an anomaly pattern can be distinguished from normal patterns without a separate process of learning the anomaly pattern.

The function of the anomaly detector 150 or 150-1 may be stored in a medium and executed in the computing device.

In accordance with the present embodiment, the anomaly pattern detection system and method can automatically detect an anomaly pattern without separately tagging the anomaly pattern, based on the fact that there is a large difference in appearance frequency between a normal pattern and an anomaly pattern.

The present embodiment can be applied to various anomaly pattern detection fields such as fraud detection in the finance world, prognosis, DRM (Digital Right Management Risk Monitoring) and network intrusion monitoring.

While various embodiments have been described above, it will be understood to those skilled in the art that the embodiments described are examples only. Accordingly, the anomaly pattern detection system and method described herein should not be limited based on the described embodiments.

What is claimed is:
1. An anomaly pattern detection system comprising an anomaly detection device connected to one or more servers, wherein the anomaly detection device comprises an anomaly detector circuit comprising:
a modeling circuit configured to extract features from first input data, generate a learning model by learning the first input data including a normal pattern and an anomaly pattern that is not distinguished from the normal pattern by considering all of the first input data as normal patterns in order to generate first output data approximate to the first input data based on the extracted features, and generate the learning model expressing the normal pattern; and
a determination circuit configured to compare by measuring similarity between second input data and second output data, as the second input data are provided and inferred to the modeling circuit to generate the second output data modeled by the learning model to detect an anomaly pattern from the second input data based on the learning model.

2. The anomaly pattern detection system according to claim 1, wherein the modeling circuit comprises:
an encoder configured to extract feature data from the first input data or the second input data; and
a decoder configured to generate the first output data or the second output data by decoding the first input data or the second input data respectively based on the extracted feature data.

3. The anomaly pattern detection system according to claim 1, wherein the modeling circuit comprises an auto-encoder configured to generate the learning model by modeling the first input data.

4. The anomaly pattern detection system according to claim 1, wherein the anomaly detection device is connected to the one or more servers through a communication network.

5. The anomaly pattern detection system according to claim 1, wherein the anomaly detection device is installed in each of the one or more servers.

6. The anomaly pattern detection system according to claim 1, wherein the anomaly detection device is implemented as an application program to be executed in each of the one or more servers, and stored in a storage medium.

7. An anomaly pattern detection method of an anomaly detection device which is connected to one or more servers, the anomaly pattern detection method comprising the steps of:
extracting, by the anomaly detection device, features from first input data;
learning, by the anomaly detection device, the first input data including a normal pattern and an anomaly pattern that is not distinguished from the normal pattern by considering all of the first input data as normal patterns, in order to generate first output data approximate to the first input data based on the extracted features;
generating, by the anomaly detection device, a learning model expressing the normal pattern, and
measuring, by the anomaly detection device, similarity between second input data to be inferred and second output data generated as an inference result of the second input data to detect an anomaly pattern from the second input data based on the learning model.

8. The anomaly pattern detection method according to claim 7, wherein the first input data is learned by an auto-encoder configured to generate the learning model by modeling the first input data.

* * * * *